(12) United States Patent
Mrziglod et al.

(10) Patent No.: US 7,406,451 B2
(45) Date of Patent: Jul. 29, 2008

(54) METHOD FOR TRAINING NEURAL NETWORKS

(75) Inventors: Thomas Mrziglod, Bergisch Gladbach (DE); Georg Mogk, Kürten (DE)

(73) Assignee: Bayer Technology Services GmbH, Leverkusen (DE)

( * ) Notice: Subject to any disclaimer, the term of this patent is extended or adjusted under 35 U.S.C. 154(b) by 554 days.

(21) Appl. No.: 10/806,594

(22) Filed: Mar. 23, 2004

(65) Prior Publication Data

US 2004/0205037 A1 Oct. 14, 2004

(30) Foreign Application Priority Data

Apr. 10, 2003 (DE) .................. 103 16 381

(51) Int. Cl.
*G06N 5/00* (2006.01)
(52) U.S. Cl. .............. 706/20; 706/12; 706/15; 706/20; 706/45; 600/409
(58) Field of Classification Search ............. 706/20, 706/15, 25, 14, 12; 600/409
See application file for complete search history.

(56) References Cited

U.S. PATENT DOCUMENTS

| | | | |
|---|---|---|---|
| 5,417,211 A * | 5/1995 | Abraham-Fuchs et al. .. | 600/409 |
| 5,699,487 A * | 12/1997 | Richardson .............. | 706/20 |
| 5,704,012 A * | 12/1997 | Bigus .................. | 706/19 |
| 5,745,652 A * | 4/1998 | Bigus .................. | 706/14 |
| 5,826,249 A * | 10/1998 | Skeirik ................ | 706/25 |
| 6,282,529 B1 * | 8/2001 | Neuneier et al. ........ | 706/15 |
| 6,523,016 B1 * | 2/2003 | Michalski .............. | 706/12 |

FOREIGN PATENT DOCUMENTS

| | | |
|---|---|---|
| WO | WO 93/00652 A | 1/1993 |
| WO | 9810352 A1 | 3/1998 |
| WO | 9834177 A2 | 8/1998 |
| WO | WO 98/3477 | 8/1998 |

OTHER PUBLICATIONS

Yan B et al "Application of probabilistic neural network and static test data to the classification of the bridge damage patterns" Proceedings of the SPIE- the International Society for Optical Engineering SPIE-Int. Soc. Opt. Eng USA Mar. 3-6, 2003 BD. 505, Marz 2003, seiten 606-617 XP 002347955 ISSN: 0277-786X.

Holmstrom L et al: "Using additive noise in back-propagation training" IEEE Transactions on Neural Networks, USA, Bd. 3 Nr. 1, Jan. 1992 Seiten 24-38, XP 00262184 ISSN:1045-9227.

Banfu Yan et al., Application of Probabilistic Neural Network and Static Test DAta to the Classification of BRidge Damage Patterns, Smart Structures and Materials 2003: Smart Systems and Nondestructive Evaluation for Civil Infrastructures, 2003, pp. 606-617, vol. 5057.

* cited by examiner

*Primary Examiner*—Wilbert L Starks, Jr.
(74) *Attorney, Agent, or Firm*—Christa Hildebrand; Norris McLaughlin & Marcus, PA

(57) ABSTRACT

The invention relates to a system and a method for training a number of neural networks, by determining a first training data record, wherein the training data have a particular accuracy, generating a number of second data training records by perturbing the first training data record with a random variable, and training each of the neural networks with one of the training data records. A prognosis and an estimation of the prognosis error can be carried out by means of such a system.

21 Claims, 3 Drawing Sheets

| | A | B | C | D | |
|---|---|---|---|---|---|
| A | | | | | |
| | | | | | |
| | | | | | |
| | | | | | |
| | | | | | |
| | | | | | |
| | | | | | |

| measurement quantity | measurement accuracy |
|---|---|
| A | w% |
| B | x% |
| C | y% |
| D | z% |

B

METHOD FOR TRAINING NEURAL NETWORKS

BACKGROUND OF THE INVENTION

The invention relates to a method for training neural networks, to a method for prognosis by means of neural networks and to a system for determining a prognosis value and its error.

A large number of possible applications for neural networks are known from the prior art. Neural networks are used for data-driven modelling, for example for physical, biological, chemical and technical processes and systems, cf. Babel W.: Possible uses of neural networks in industry: pattern recognition with the aid of supervised learning methods— with examples from traffic and medical technology, Expert Verlag, Renningen-Malmsheim, 1997. In particular, the fields in which neural networks can be used include process optimization, image processing, pattern recognition, robot control and medical technology.

Before a neural network can be used for the purposes of prognosis or optimization, it has to be trained. The weightings of the neurons are in this case usually adjusted by an iterative method with the aid of training data, cf. Bärmann F.: Process modelling: modelling of continuous systems with neural networks, the NN-tool Internet site, www.baermann.de and Bärmann F.: Neural networks. Lecture text. Technical College of Gelsenkirchen, School of Physical Technology, Department of Neuro-Information Technology, 1998.

DE 195 31 967 discloses a method for training a neural network with the nondeterministic behaviour of a technical system. The neural network is in this case incorporated into a control loop so that, as it is output quantity, the neural network outputs a manipulated variable to the technical system and the technical system generates, from the manipulated variable delivered by the neural network, controlled variable which is delivered to the neural network as an input quantity. Noise with a known noise distribution is superimposed on the controlled variable before it is delivered to the technical system.

Other methods for training neural networks are known from DE 692 28 412 T2 and DE 198 38 654 C1.

A method for estimating the prognosis error is known from EP 0 762 245 B1. Here, a plurality of neural networks having different training parameters (e.g. different initialisation) are trained with the original data. The prognosis error is obtained by comparing the discrepancies of the prognosed quantities. A disadvantage of this method is that the estimation of the prognosis error is not influenced by information about the measurement accuracy of the measurement data used for the training.

A method for estimating the reliability of a prognosis output by a neural network is furthermore known from the prior art: Protzel P., Kindermann L., Tagscherer M., Lewandowski A.: "Estimation of the reliability of neural network prognoses in process optimization", VDI Report No. 1526, 2000.

SUMMARY OF THE INVENTION

It is an aspect of the invention to provide an improved method for training neural networks, a method for prognosis by means of neural networks and a system for determining prognosis values and their errors.

The aspect of the invention is respectively achieved by the features of the independent patent claims. Preferred embodiments of the invention are specified in the dependent claims.

The invention makes it possible to take account of the fact that the training data for the training of a neural network have only a finite accuracy. If the training data are determined by a measurement technique, for example, then a measurement accuracy can be specified for each datum. In order to take this limited measurement accuracy into account for training the neural network, further sets of training data records are generated. Each individual set of training data is obtained from the original data records by perturbing the data in the framework of the measurement accuracy. One neural network is then trained for each training data record generated in this way.

If input data are entered into the neural networks trained in this way, then each of these networks generates a prognosis. Due to the different training data, which were obtained by perturbation and were used for training the neural networks, these prognoses can differ from one another. A mean, which has a higher accuracy and reliability then the individual prognoses, is preferably formed from the various prognoses.

According to a preferred embodiment of the invention, an equidistributed random variable with an expectation of zero is added to the training data. The random variable is in this case selected so that the result of the addition of the output datum and the random variable lies within the range given by the measurement accuracy.

According to another preferred embodiment of the invention, a normally distributed random variable with an expectation of zero is added. The variance of the random variable is selected so that the result of the addition of the output datum and the random variable lies with a predetermined probability within the range given by the measurement accuracy. This predetermined probability is, for example, 95% or more.

According to another preferred embodiment of the invention, the reliability of the prognosis value is determined on the basis of how the prognoses determined by the neural networks differ. If the individual prognoses of the neural networks differ greatly from one another, then it can be inferred from this that the neural networks do not constitute a reliable model in the range of the current input data. In order to assess the reliability, the standard deviation of the individual prognoses may for example be calculated. If the standard deviation exceeds a permissible measure, it is concluded from this that a reliable prognosis is not possible.

A particular advantage is that the present invention permits estimation of the prognosis error and therefore objective appraisal of the quality of the prognosis. According to a preferred embodiment, the standard deviation is used for estimating the prognosis error. For example, the standard deviation itself is used as a measure of the prognosis error. As an alternative, the prognosis error is calculated from the standard deviation with the aid of a monotonic function, for example by multiplying the standard deviation with a problem-dependent constant factor.

According to another preferred embodiment of the invention, a signal is output when the standard deviation of the prognoses lies above a predetermined threshold value. The signal may, for example, lead to a visual and/or acoustic output for a user. This is particularly advantageous when the neural networks are being used for a control process.

BRIEF DESCRIPTION OF THE DRAWINGS

Preferred embodiments of the invention will be explained in more detail below with reference to the drawings, in which:

FIGS. 2A and 2B show a schematic representation of a training data record for the neural network in FIG. 1.

DETAILED DESCRIPTION OF THE PRESENTLY PREFERRED EMBODIMENTS

Figures 1, 2:
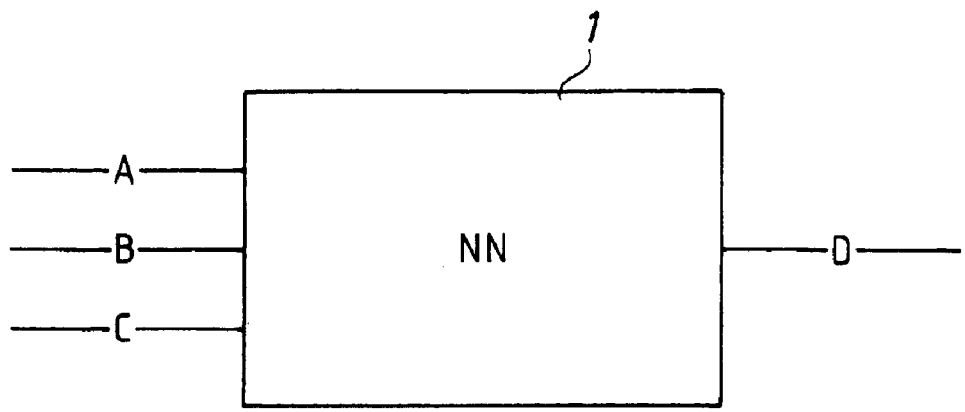
FIG. 1 shows a block diagram of a neural network.

FIG. 1 shows a neural network 1 with the inputs A, B and C and with the output D. In the general case, the neural network 1 may have an arbitrary number of inputs and outputs. The neural network may furthermore contain rigorous model components. In this case, the term hybrid neural network is used.

A training data record 2 (cf. FIG. 2A) is used for training the neural network 1. The training data record 2 involves a series of measurement samples, which respectively consist of measurement values for the measurement quantities A, B, C and D. These measurement quantities are assigned to the corresponding input of the neural network.

The measurement values are, for example, obtained from experimental series which are carried out in order to determine training data. The measurement accuracies of the individual measurement quantities are specified in a table 3. The measurement quantity A is determined with a measurement accuracy of +/− w, the measurement quantity B is determined with a measurement accuracy of +/− x, the measurement quantity C is determined with a measurement accuracy of +/− y and the measurement quantity D is determined with a measurement accuracy of +/− z.

Figure 3:
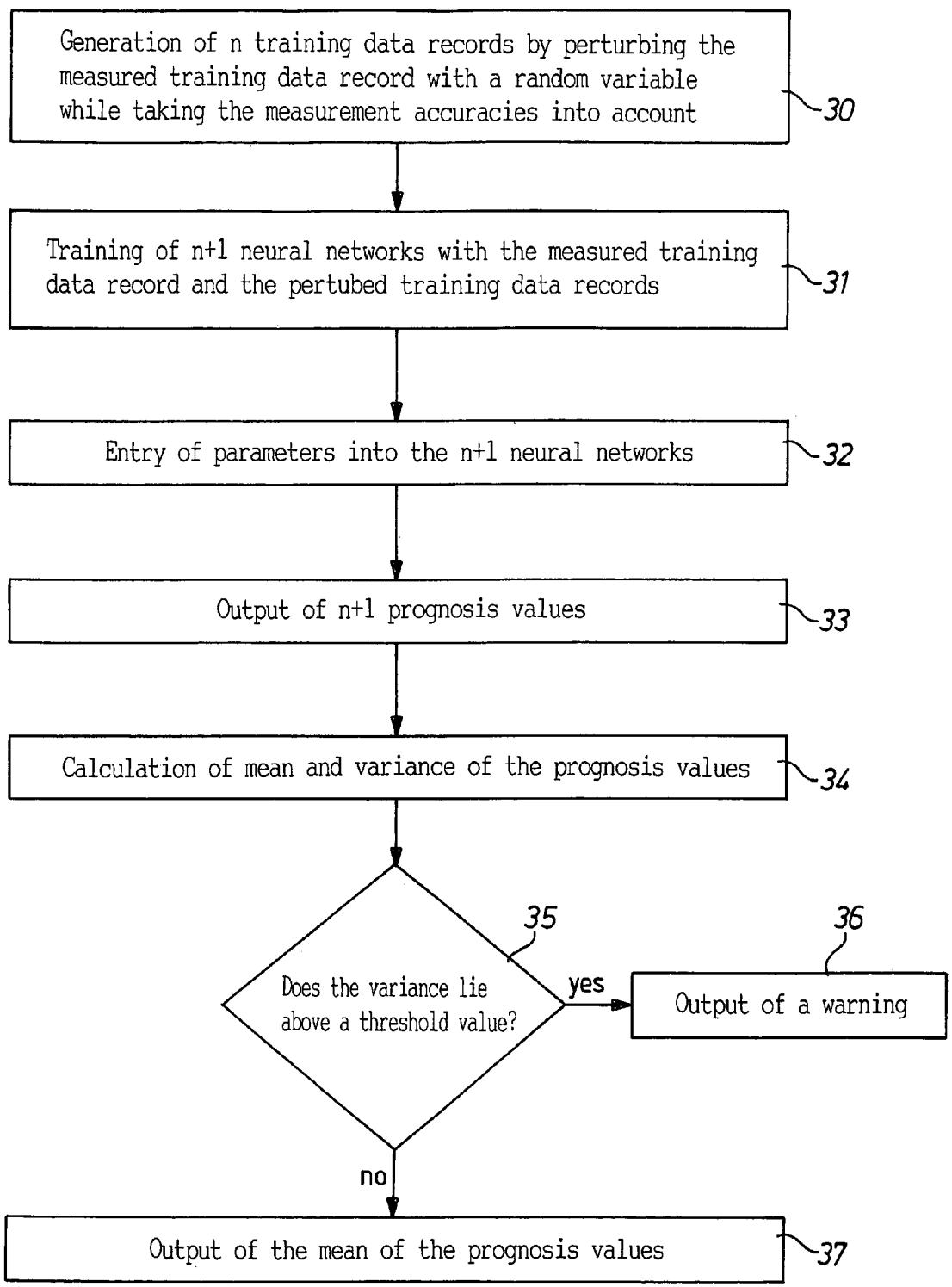
FIG. 3 shows a flow chart of an embodiment of the method according to the invention for training neural networks and for determining a prognosis value.

FIG. 3 illustrates a preferred embodiment of the method according to the invention. In step 30, a number n of training data records is generated from the training data record 2 (cf. FIG. 2).

A further training data record i, with i lying between 1 and n, is obtained in the basis of the training data record 2 by perturbing the individual measurement values of the measurement quantities A, B, C and D for each measurement sample while taking the respective measurement accuracy of the relevant measurement quantity into account. This process, i.e. the perturbation the training data record 2, is carried out n times so as to obtain the n training data records.

For example, the perturbation of the measurement values of the training data record 2 is carried out by adding an equidistributed random number. A perturbed measurement value x' is obtained from the originally measured measurement value x as:

$$x' = x + \text{random number},$$

where the random number lies in the interval

[lower limit; upper limit].

The lower limit and the upper limit may in this case depend on the original measurement value x and the measurement accuracy. If the measurement accuracy was specified as a relative error for the measurement value x, for example, then the following limits may be selected:

lower limit=−relative measurement accuracy*x upper limit=relative measurement accuracy*x In the normal case, the lower limit is a value less than 0, whereas the upper limit is a value greater than 0. In this case, the perturbed measurement value x' lies within the range of the measurement accuracy. If a measurement value for the measurement quantity A is to be perturbed, for example, then a random variable is added to the measurement value actually determined for the measurement quantity A.

This random variable is a random number from the interval [lower limit; upper limit], in which case the lower limit and the upper limit may depend on the measurement value x (see above) or the lower limit and the upper limit are fixed quantities.

As an alternative, the random number may also be normally distributed. In this case, the variance of the random number is selected so that the perturbed measurement value x' lies with a predetermined probability in the tolerance range predetermined by the measurement accuracy. The predetermined probability may, for example, be selected as ≧95%.

In step 31, a number n+1 of neural networks of the same type as the neural network 1 in FIG. 1 are trained with the training data record 2 and the n further training data records obtained in this way. This provides n neural networks with the same input and output parameters, which have been trained with perturbed training data records based on the same training data record determined by a measurement technique.

In order to determine a prognosis value, in step 32 an input data record of parameter values is entered into the inputs A, B and C of the neural networks trained in step 31. In step 33, the neural networks respectively output a prognosis value at their outputs; in the exemplary case in question, there are hence n+1 prognosis values at the outputs D.

The mean and the standard deviation of the prognosis values output in step 33 are calculated in step 34. Step 35 tests whether the standard deviation lies above a threshold value. If it does, a warning is outputted in step 36. The output of a warning means that the prognosis of the neural networks for the current training data record is not sufficiently reliable.

If the standard deviation lies below the threshold value, however, then no such warning is outputted in step 37, the mean of the prognosis values is outputted as the result of the prognosis. In addition or as an alternative, the standard deviation is output as a measure of the prognosis error.

Figure 4:
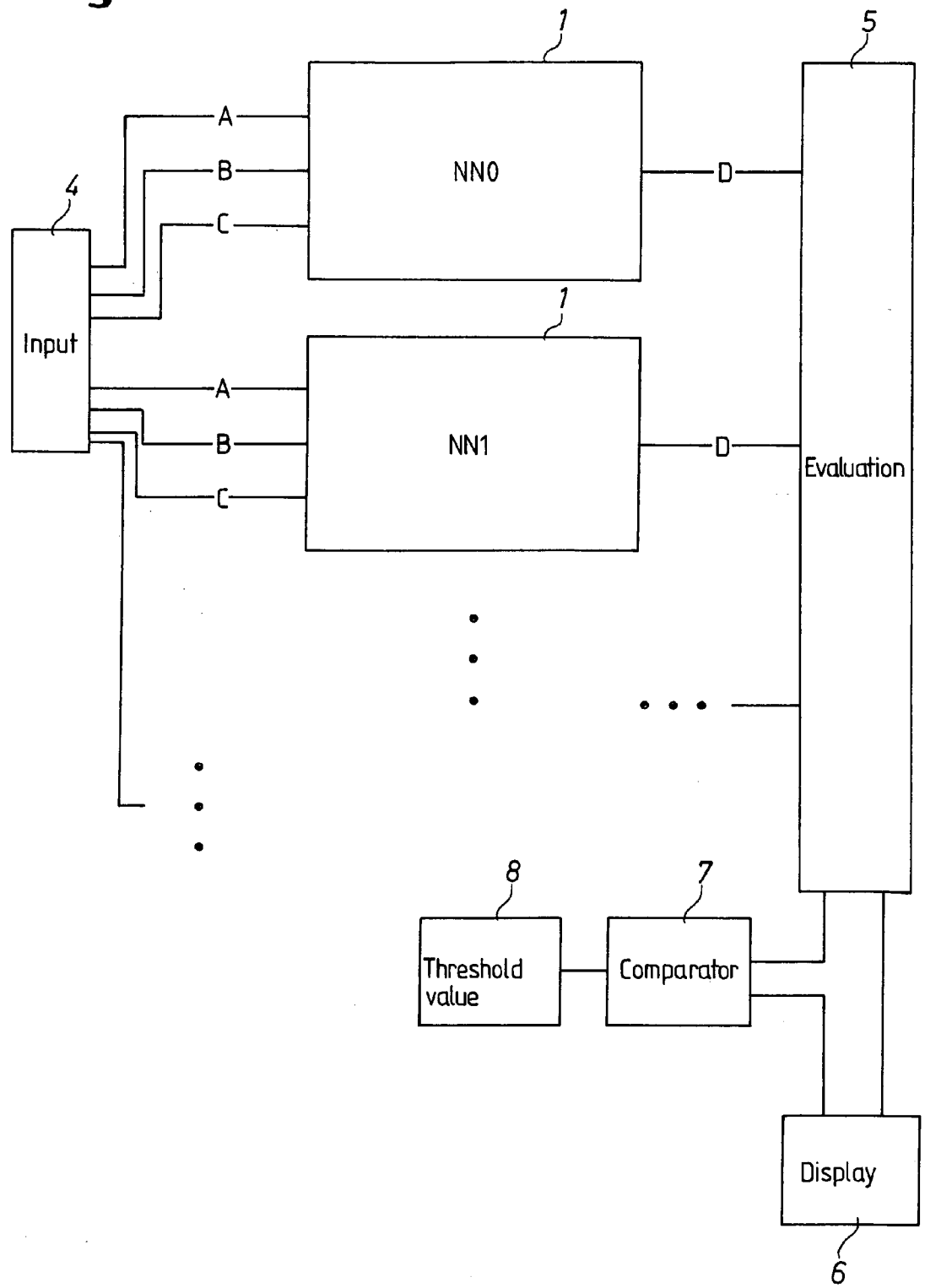
FIG. 4 shows a block diagram of a system according to the invention for determining a prognosis value.

FIG. 4 shows a block diagram of an embodiment of the system according to the invention. Elements of FIG. 4 which correspond to elements of FIG. 1 are denoted by the same reference numbers.

The system involves a number n+1 of neural networks 1, which are constructed identically in principle, i.e. each have the inputs A, B and C and with the output D.

The inputs A, B and C of the neural networks 1 are connected to an input module 4 via which an input parameter record, for which a prognosis is to be carried out, is entered into the neural networks 1.

Due to this input of input data, each of the neural networks 1 outputs a prognosis for the measurement quantity D at its output. These prognoses are entered into the evaluation module 5. The evaluation module 5 calculates the mean of the various prognoses for the measurement quantity D, as well as the standard deviation of the prognoses.

The evaluation module 5 is connected to a display unit 6 and to a comparator 7. The comparator 7 is connected to a threshold-value memory 8.

The evaluation module 5 outputs the calculated mean of the prognoses to the display unit 6, so that the prognosis value is displayed there. The evaluation module 5 furthermore outputs the standard deviation of the prognoses to the comparator 7. The comparator 7 compares the standard deviation with the threshold value stored in the threshold-value memory 8. If the standard deviation lies above the threshold value, then the comparator 7 outputs a signal which is displayed as warning information on the display unit 6. Hence, if a prognosis value is displayed on the display unit 6 together with warning information, this means that the spread of the individual prognoses of the neural networks 1 is relatively large, so that the resulting prognosis value is not regarded as sufficiently reliable.

The standard deviation may furthermore be output for a user via the display 6 as a measure of the prognosis error.

What is claimed is:

1. A method for training a plurality of neural networks for process optimization, comprising the steps of:
    determining a first training data record, wherein each training datum has a measurement accuracy and wherein the training data are obtained by perturbing the data within an error range of the measurement accuracy;
    generating a plurality of second data training records by perturbing the first training data record with a random variable;
    training each of the plurality of neural networks with one of the training data records; and applying the trained neural networks to process optimization.

2. The method according to claim 1, wherein the second training data is assigned an accuracy.

3. The method according to claim 1, wherein the first and second training data involve measurement quantities, each measurement quantity having a measurement accuracy.

4. The method according to claim 1, wherein the random variable is an equidistributed random variable.

5. The method according to claim 4, wherein the random variable has an expectation of zero and a result of an addition of the random variable to the training datum lies within an accuracy range of the training datum.

6. The method according to claim 1, wherein the random variable is a normally distributed random variable.

7. The method according to claim 6, wherein the random variable has an expectation of zero and a result of an addition of the random variable to the respective datum lies with a predetermined probability within the accuracy range of the training datum.

8. The method according to claim 7, wherein the predetermined probability is about greater than or equal to 95%.

9. The method according to claim 8, wherein the predetermined probability is about 99%.

10. The method according to claim 1, wherein the random variable is taken from a rigidly predetermined level.

11. The method according to claim 1, wherein the random variable is taken from an interval dependent on the accuracy.

12. The method according to claim 11, wherein the prognosis value is calculated by averaging the prognoses output by the plurality of neural networks.

13. The method according to claim 12, wherein the prognosis value is compared with a threshold and a signal is outputted when the standard deviation lies above the threshold value.

14. The method according to claim 11, wherein a standard deviation of the prognoses output by the plurality of neural networks is determined as a measure of the reliability of the prognosis value.

15. A method for providing a prognosis by utilizing a plurality of neural networks, comprising the steps of:
    determining a first training data record, each training datum has a measurement accuracy and wherein the training data are obtained by perturbing the data in an error range of the measurement accuracy;
    generating a plurality of second data training records by perturbing the first training data record with a random variable;
    training each of the plurality of neural networks with one of the training data records; and
    determining a prognosis value based on an evaluation of the prognoses output by the plurality of neural networks.

16. The method according to claim 15, wherein the standard deviation of the prognoses output by the plurality of neural networks is used as a measure of the prognosis error.

17. A computer system for determining at least one of prognosis value, comprising
    a plurality of neural networks trained by training data records, each training datum has a measurement accuracy and wherein the training data are obtained by perturbing the data in an error range of the measurement accuracy;
    an input means for entering input data into the neural networks,
    an evaluating means for evaluating the prognoses output by the neural networks for determining a prognosis value.

18. The computer system according to claim 17, wherein the evaluation means are designed to calculate the mean of the prognoses.

19. The computer system according to claim 17, wherein the evaluation means are designed to calculate a standard deviation of the prognoses as a measure of the reliability of the prognosis value.

20. The computer system according to claim 19, further comprising means for comparing the standard deviation with a predetermined threshold value, and for outputting a signal when the standard deviation lies above the threshold value.

21. The computer system according to claim 17, further comprising means for outputting a prognosis error, the prognosis error being determined on the basis of the standard deviation.

* * * * *

UNITED STATES PATENT AND TRADEMARK OFFICE
CERTIFICATE OF CORRECTION

PATENT NO.         : 7,406,451 B2
APPLICATION NO.    : 10/806594
DATED              : July 29, 2008
INVENTOR(S)        : Thomas Mrziglod et al.

It is certified that error appears in the above-identified patent and that said Letters Patent is hereby corrected as shown below:

Column 4, line 13 "≧95%" should read -- ≥95% --.

Signed and Sealed this

First Day of December, 2009

David J. Kappos
*Director of the United States Patent and Trademark Office*